(12) United States Patent
Hwang et al.

(10) Patent No.: US 8,474,024 B2
(45) Date of Patent: Jun. 25, 2013

(54) METHOD AND DEVICE FOR PLAYING BACK MEDIA DATA WITH LIMITED CONTROL

(75) Inventors: In-Chul Hwang, Suwon-si (KR); Ho Jin, Yongin-si (KR); Eun-Hee Rhim, Yongin-si (KR); Mun-Jo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 12/864,523

(22) PCT Filed: Jan. 22, 2009

(86) PCT No.: PCT/KR2009/000323
§ 371 (c)(1),
(2), (4) Date: Jul. 26, 2010

(87) PCT Pub. No.: WO2009/093847
PCT Pub. Date: Jul. 30, 2009

(65) Prior Publication Data
US 2011/0010727 A1 Jan. 13, 2011

Related U.S. Application Data

(60) Provisional application No. 61/023,601, filed on Jan. 25, 2008.

(51) Int. Cl.
*H04L 29/06* (2006.01)
(52) U.S. Cl.
USPC .............................................................. 726/6

(58) Field of Classification Search
USPC ............................................................ 726/26
See application file for complete search history.

(56) References Cited

U.S. PATENT DOCUMENTS

| | | | |
|---|---|---|---|
| 2003/0014496 A1* | 1/2003 | Spencer et al. | 709/217 |
| 2004/0103428 A1 | 5/2004 | Seok et al. | |
| 2006/0085816 A1 | 4/2006 | Funk et al. | |
| 2006/0117342 A1 | 6/2006 | Park et al. | |
| 2006/0259927 A1 | 11/2006 | Acharya et al. | |
| 2006/0291412 A1 | 12/2006 | Naqvi et al. | |
| 2007/0064637 A1 | 3/2007 | Lee et al. | |
| 2007/0143444 A1 | 6/2007 | Kamiya et al. | |

(Continued)

FOREIGN PATENT DOCUMENTS

| | | |
|---|---|---|
| CN | 1620129 A | 5/2005 |
| CN | 1685323 A | 10/2005 |

(Continued)

OTHER PUBLICATIONS

Communication from the European Patent Office dated Sep. 29, 2011, in counterpart European Application No. 09704867.2.

(Continued)

*Primary Examiner* — Michael S McNally
(74) *Attorney, Agent, or Firm* — Sughrue Mion, PLLC (57) ABSTRACT

A method and apparatus for restricting a control operation with respect to reproduction of media data so as to commercially implement consumption of the media data, the method and apparatus including: restricting the control operation with respect to reproduction of the media data by using a predetermined Application Programming Interface (API); and reproducing the media data received from a media server, according to the restricted control operation.

26 Claims, 6 Drawing Sheets

U.S. PATENT DOCUMENTS

| | | | |
|---|---|---|---|
| 2007/0162931 | A1 | 7/2007 | Mickle et al. |
| 2007/0206773 | A1 | 9/2007 | Branam |
| 2007/0240200 | A1 | 10/2007 | Han |
| 2008/0141285 | A1 | 6/2008 | Lee et al. |
| 2008/0212937 | A1 | 9/2008 | Son |
| 2009/0100147 | A1 | 4/2009 | Igarashi |
| 2009/0183211 | A1 | 7/2009 | Yan et al. |

FOREIGN PATENT DOCUMENTS

| | | |
|---|---|---|
| CN | 1798112 A | 7/2006 |
| CN | 1839631 A | 9/2006 |
| CN | 1852411 A | 10/2006 |
| CN | 101060532 A | 10/2007 |
| CN | 101155191 A | 4/2008 |
| EP | 1 235 431 A1 | 8/2002 |
| EP | 1 667 454 A1 | 6/2006 |
| JP | 2002-366835 A | 12/2002 |
| JP | 2007272868 A | 10/2007 |
| KR | 10-2001-0025456 A | 4/2001 |
| KR | 10-2006-0066096 A | 6/2006 |
| KR | 10-2006-0103621 A | 10/2006 |
| KR | 10-2007-0032103 A | 3/2007 |
| KR | 10-2007-0100069 A | 10/2007 |
| KR | 10-2008-0010862 A | 1/2008 |
| WO | 2007/102547 A1 | 9/2007 |
| WO | 2007/102550 A1 | 9/2007 |

OTHER PUBLICATIONS

Communication dated Mar. 20, 2012 from the State Intellectual Property Office of P.R. China in a counterpart application No. 200980103120.1.

International Search Report for PCT/KR2009/000323 issued Aug. 18, 2009 [PCT/ISA/210].

International Preliminary Report on Patentability for PCT/KR2009/000323 issued Apr. 27, 2010 [PCT/IPEA/409].

Digital Video Broadcasting (DVB) Transport of MPEG-2 Transport Stream (TS) Based DVB Services over IP Based Networks Document DVB A086 Rev.5, Jul. 2007, 126 pages.

Communication, dated Jun. 8, 2012, issued by the State Intellectual Property Office of P.R. China in counterpart Chinese Application No. 200980111266.0.

Communication, dated Jun. 27, 2012, issued by the State Intellectual Property Office of P.R. China in counterpart Chinese Application No. 200980104286.5.

Communication, dated Aug. 3, 2012, issued by the Indonesian Patent Office in counterpart Indonesian Applicatio No. W-00201003224.

Communication, dated Jul. 3, 2012, issued by the State Intellectual Property Office of P.R. China in counterpart Chinese Application No. 200980109747.8.

Open IPTV Forum Standard Function Architecture V1.0 Working Draft, Members of the Open IPTV Forum, Sep. 20, 2007, pp. 1-14.

Communication dated Nov. 5, 2012 issued by the State Intellectual Property Office of the People's Republic of China in counterpart Chinese Application No. 200880117209.9.

Communication dated Feb. 28, 2013 issued by the State Intellectual Property Office of P.R. China in counterpart Chinese Patent Application No. 200980110455.6.

Communication dated Jan. 5, 2013 issued by the State Intellectual Property Office of P.R. China in counterpart Chinese Patent Application No. 200980126539.9.

* cited by examiner

FIG. 2B

0x00 : AdvancedPlayer Mode
0x01 : PrimitivePlayer Mode
0x02 : BasicPlayer Mode

METHOD AND DEVICE FOR PLAYING BACK MEDIA DATA WITH LIMITED CONTROL

CROSS-REFERENCE TO RELATED APPLICATIONS

This application is a National Stage application under 35 U.S.C. §371 of PCT/KR2009/000323 filed on Jan. 22, 2009, which claims the benefit of U.S. provisional Patent Application No. 61/023,601, filed on Jan. 25, 2008, the disclosures of which are incorporated herein in their entirety by reference.

BACKGROUND

1. Field

Apparatuses and methods consistent with exemplary embodiments relate to a method and apparatus for reproducing media data, and more particularly, to a method and apparatus for reproducing media data while restricting a control operation with respect to reproduction of the media data.

2. Description of the Related Art

Due to an increase in media data exchanged via wireless or wired communication networks, various methods have been developed to commercially implement use of media data. For example, a user may be provided free media data, and in return, the user has to view an advertisement related to the free media data. In this manner, media data consumption by the user is commercially implemented.

In this case, if the user does not view the advertisement by using a skip function or a fast forward function, the media data consumption cannot be commercially implemented. Also, if a user records the free media data and indiscriminately shares the recorded media data with other users, the media data consumption may not be commercially implemented.

Thus, a media data provider requires control operations including recording, skipping, and fast-forwarding of media data to be restricted so as to prevent execution of the control operations while a user reproduces the media data.

SUMMARY

Aspects of exemplary embodiments provide a method and apparatus for reproducing media data while restricting a control operation by a user. Aspects of exemplary embodiments also provide a computer readable recording medium having recorded thereon a program for executing the method.

According to an aspect of an exemplary embodiment, there is provided a method of reproducing media data received from a media server, performed by a client device, the method including: driving a browser including an application programming interface (API) for restricting a control operation with respect to reproduction of the media data; restricting the control operation with respect to the reproduction of the media data by using the API; and reproducing the media data based on the restricted control operation.

The restricting the control operation may include: receiving information about the restricting of the control operation; and retrieving the API for restricting the control operation with respect to the reproduction of the media data, according to the received information.

The receiving the information may include receiving information as metadata before a session for the reproduction of the media data is started, or receiving a notification according to the Consumer Electronics Association (CEA)-2014 standard during a session for the reproduction of the media data, wherein the notification is related to the restricting of the control operation.

The receiving the information may include receiving the information about the restricting of the control operation according to Asynchronous JavaScript and Extensible Markup Language (AJAX) during a session for the reproduction of the media data.

The receiving the information may include receiving the information about the restricting of the control operation from a server that is different from the media server.

The reproducing the media data may include: when an input indicating a control operation is received from a user, determining whether the control operation is a restricted control operation; when the control operation is determined as the restricted control operation, ignoring the control operation and continuing the reproducing the media data.

According to an aspect of another exemplary embodiment, there is provided a media data reproducing apparatus that is a client device for reproducing media data received from a media server, the media data reproducing apparatus including: a browser driving unit which drives a browser including an application programming interface (API) for restricting a control operation with respect to reproduction of the media data; and an application driving unit which restricts the control operation with respect to reproduction of the media data by using the API, and which drives an application that reproduces the media data based on the control operation.

According to an aspect of another exemplary embodiment, there is provided a computer readable recording medium having recorded thereon a program for executing the method of reproducing the media data.

According to an aspect of another exemplary embodiment, there is provided a method of providing media data, the method including: transmitting, from a first server to a client device, media data; and transmitting, from a second server to the client device, information about restricting a control operation with respect to a reproduction of the media data by the client device, wherein the information is used by the client device to retrieve an application programming interface (API) for restricting the control operation with respect to the reproduction of the media data.

According to an aspect of another exemplary embodiment, there is provided a method of reproducing media data received from a media server, performed by a client device, the method including: restricting a control operation with respect to a reproduction, by the client device, of media data by using an application programming interface (API); and reproducing the media data based on the restricted control operation.

BRIEF DESCRIPTION OF THE DRAWINGS

The above and/or other aspects will become more apparent by describing in detail exemplary embodiments thereof with reference to the attached drawings in which.

DETAILED DESCRIPTION OF EXEMPLARY EMBODIMENTS

Hereinafter, exemplary embodiments will be described in detail with reference to the attached drawings. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

Figure 1:
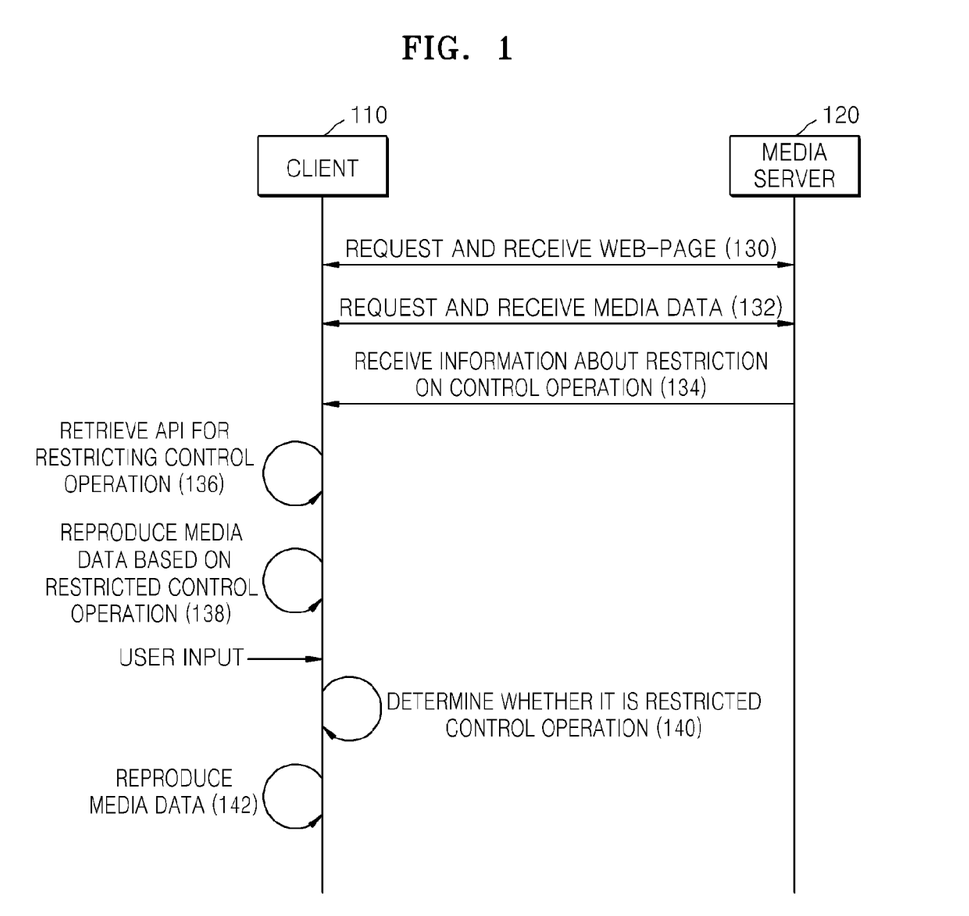
FIG. 1 is a flowchart of a method of reproducing media data according to an exemplary embodiment.

FIG. 1 is a flowchart of a method of reproducing media data according to an exemplary embodiment. Referring to FIG. 1, a client 110 is a device for consuming media data. In particular, the client 110 receives media data from a media server 120, and reproduces the media data. The media data may be audio/video (AV) media data. The client 110 may include a browser compatible with the Consumer Electronics Association (CEA)-2014 standard. The CEA-2014 standard is for a web-based protocol and a frame work for a remote user interface using a Universal Plug and Play (UPnP) network and the Internet. Furthermore, the CEA-2014 standard provides the remote user interface to UPnP devices via the web, and allows the UPnP devices to perform a remote control based on the remote user interface. It is understood that another exemplary embodiment is not limited to the CEA-2014 standard.

The client 110 drives the browser, and drives an application for reproduction of the received media data based on the driven browser. The browser provides an environment for driving the application for reproduction of the received media data, and includes at least one application programming interface (API) related to reproduction of the received media data. The at least one API related to reproduction of the received media data may include an API for restricting a control operation with respect to reproduction of the received media data. The application may be a webpage related to reproduction of the received media data. In this case, the webpage may include a link or a script that is related to reproduction of the received media data.

In operation 130, the client 110 requests the media server 120 for the application (e.g., the webpage) for reproduction of the media data, and receives the application in response to the request. For example, the client 110 may receive the webpage including the link or the script related to reproduction of the media data.

In operation 132, the client 110 requests the media server 120 for the media data by driving the application received in operation 130, and receives the media data in response to the request. The client 110 receives the media data in a streaming manner or a downloading manner.

In operation 134, the client 110 receives, from the media server 120, information about restriction on a control operation that may be performed by a user.

In the present exemplary embodiment, a session for reproduction of the media data is started according to the request for the media data by the client 110 in operation 132. After the session for reproduction of the media data is started, the information about restriction on the control operation may be separately received from the media server 120 in operation 134. However, it is understood that other exemplary embodiments are not limited thereto. For example, according to another exemplary embodiment, the client 110 may receive the information when the session is started in operation 132 (e.g., as metadata).

As non-limiting examples, the information about restriction on the control operation may be received in the form of a notification according to the CEA-2014 standard after the session for reproduction of the media data is started, or may be received according to Asynchronous JavaScript and Extensible Markup Language (AJAX). In the latter case, the client 110 may drive an application supporting the AJAX and may receive only necessary information, that is, the information about restriction on the control operation, from the media server 120 without reloading entire pages. Thus, after the session for reproduction of the media data is started, the client 110 may request the media server 120 for the information about restriction on the control operation, and may receive the requested information about restriction on the control operation, according to the AJAX.

The information about restriction on the control operation may be information related to restriction on pausing or stopping the media data, or may be information related to restriction on recording the media data. For example, in cases where a user is to view an advertisement before the media data is to be reproduced, the information about restriction on the control operation may be related to restriction on pausing or stopping the advertisement. Also, in order to protect a copyright of the media data when the media data is being reproduced, the information about restriction on the control operation may be related to restriction on recording the media data.

In operation 136, the client 110 restricts the control operation with respect to reproduction of the media data, according to the information received in operation 134. The client 110 retrieves the API for restricting the control operation with respect to reproduction of the media data, according to the information received in operation 134. The retrieved API specifies at least one of control operations allowed during reproduction of the media data and specifies control operations prevented during reproduction of the media data. This operation will be described in detail with reference to FIGS. 2A and 2B.

Figure 2A:
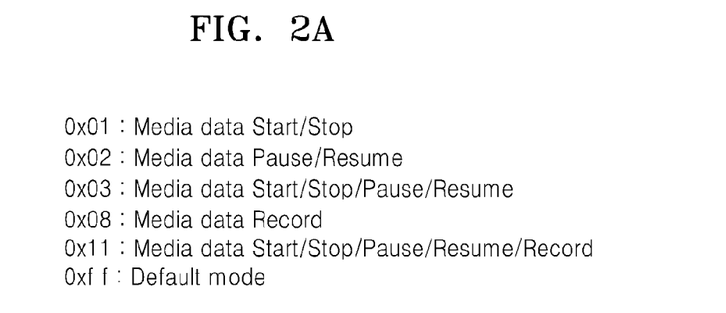
FIGS. 2A and 2B illustrate an application programming interface (API) for restricting a control operation with respect to reproduction of media data, according to one or more exemplary embodiments.
Figure 2B:
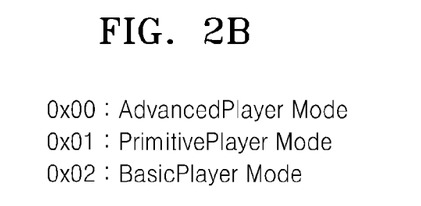

FIGS. 2A and 2B illustrate APIs for restricting a control operation with respect to reproduction of media data, according to one or more exemplary embodiments. Referring to FIG. 2A, the API includes an object method and object properties for restricting the control operation with respect to reproduction of the media data.

"SetMode" is a control operation restricting method that involves setting possible control operations by receiving variables corresponding to modes illustrated in FIG. 2A from a webpage that is an application driven in the client 110. For example, when "0x01" is input to the API as a variable, it is only possible to start and stop the media data, and when "0x02" is input to the API as a variable, it is only possible to pause and resume the media data. In order to make a start, stop, pause, and resumption possible, "0x03" is input as a variable, wherein "0x03" is a combination of "0x01" and "0x02" and is "00000011" in binary. "0x08" is a variable for restricting recording of the media data, and when "0x11" (i.e., "00001011" in binary) is input as a variable, it is possible to start, stop, pause, resume, and record the media data.

In order to restrict another control operation, the aforementioned four bits may be used, and in order to restrict the control operation by using a "default mode" (i.e., a basic setting in a browser), "0xff" (i.e., a binary number of "11111111") is input.

The object properties are provided to indicate a current state restricted by the "SetMode" method. For example, "Playmode" is an object property that indicates a current restriction state of the control operation, and "recordMode" is an object property that indicates whether recording of the media data is currently restricted.

Also, in relation to operations 140 and 142 (to be described later), in order to inform a user about an occurrence of an error when the user inputs a control operation that is not allowed, "error" may be provided as an object property.

Referring to FIG. 2B, similar to the API of FIG. 2A, the API of FIG. 2B includes an object method and object properties for restricting the control operation with respect to reproduction of the media data. Comparing the API of FIG. 2B with the API of FIG. 2A, the API of FIG. 2B is different in that variables input to the "SetMode" method do not correspond to modes for specific control operations, but correspond to reproduction modes that are combinations of a plurality of control operations.

In other words, when "0x00" is input to the "SetMode" method as a variable, the client 10 may be set as "AdvancedPlayer Mode" in which all control operations are possible. when "0x01" is input to the "SetMode" method as a variable, the client 10 may be set as "PrimitivePlayer Mode" in which it is only possible to start and stop reproduction of the media data. In "PrimitivePlayer Mode," adjusting a media data reproduction speed, searching for the media data, and seeking to previous/next media data is restricted. When "0x02" is input to the "SetMode" method as a variable, the client 110 may be set as "BasicPlayer Mode" in which only adjusting a media data reproduction speed is restricted.

Referring back to FIG. 1, in operation 138, the client 110 reproduces the media data according to the control operation restricted in operation 136. That is, the media data is reproduced according to the restricted control operation.

A user may input a control operation during reproduction of the media data. In this case, in operation 140, the client 110 determines whether the control operation input by the user is restricted in operation 136.

In operation 142, if the control operation input by the user in operation 140 is not allowed by the restricted control operation, the client 110 ignores the user input and continues reproducing the media data. However, if the control operation input by the user in operation 140 is allowed by the restricted control operation, the client 110 performs the control operation according to the user input.

Figure 3:
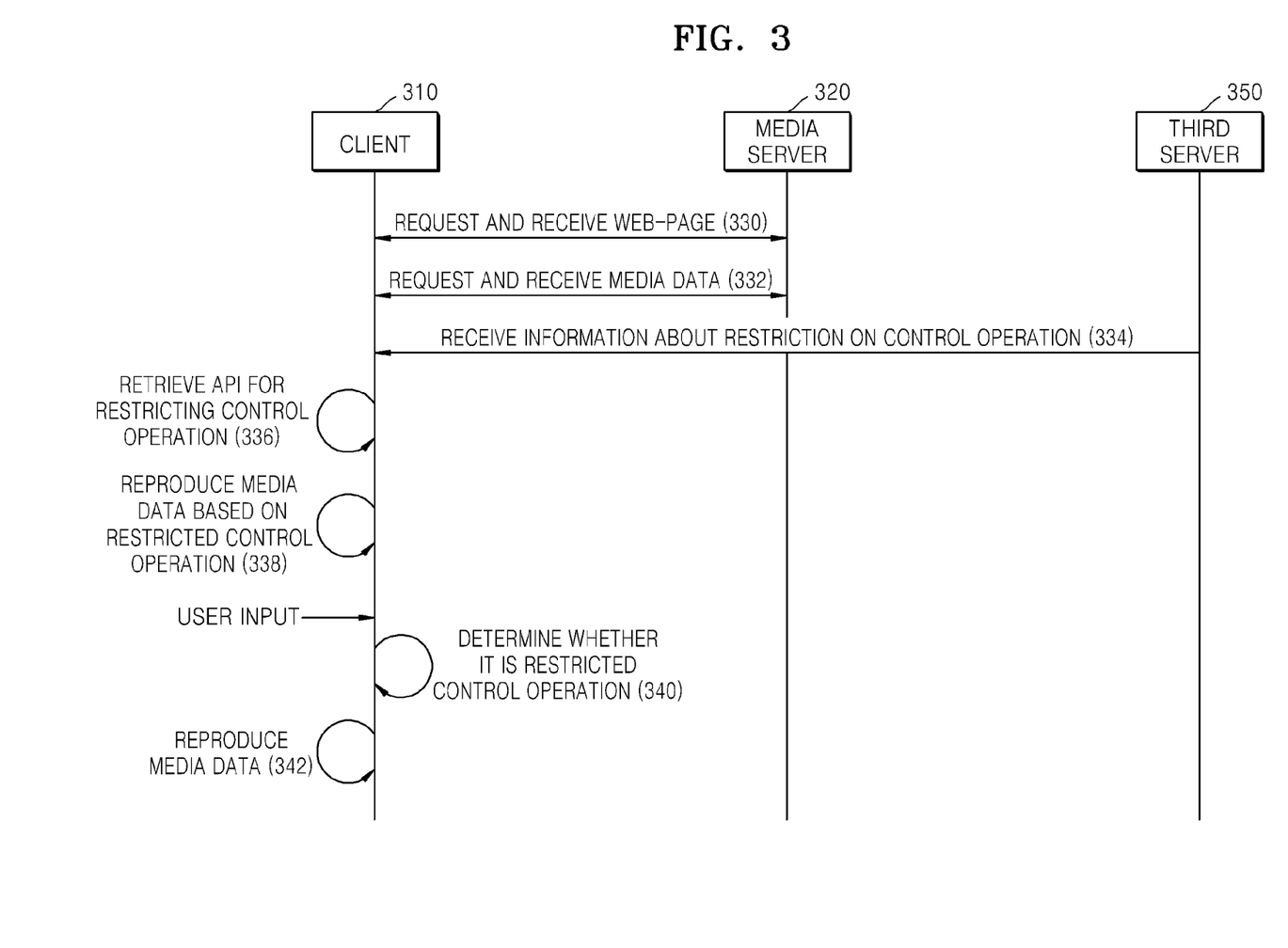
FIG. 3 is a flowchart of a method of reproducing media data according to another exemplary embodiment.

FIG. 3 is a flowchart of a method of reproducing media data according to another exemplary embodiment. Comparing the method of FIG. 3 with the method of FIG. 1, operation 334 is different. In the method of FIG. 1, the client 110 receives the information about restriction on the control operation from the media server 120 that provides the media data. However, in the method of FIG. 3, a client 310 does not receive the information from a media server 320 but receives the information from a third server 350. The third server 350 is a separate server for managing reproduction of the media data, and may be a digital right management (DRM) server that is separately operated by a provider of the media data. The rest of operations 330, 332, 336, 338, 340, and 342 of FIG. 3 are the same or similar to operations 130, 132, 136, 138, 140, and 142 of FIG. 2, respectively.

Figure 4:
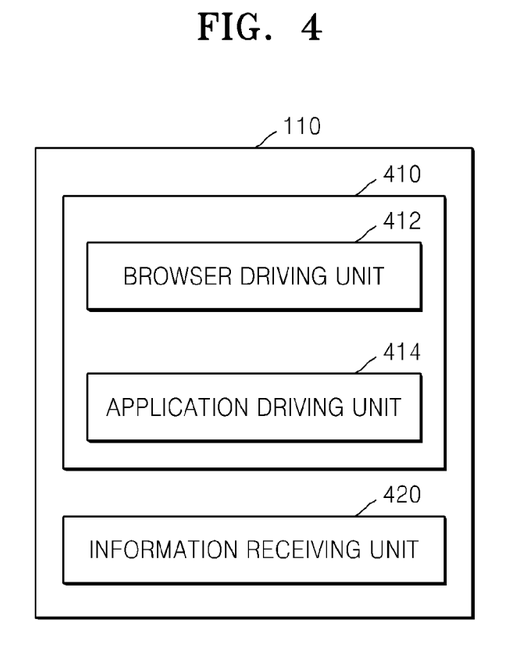
FIG. 4 is a diagram of a client, according to an exemplary embodiment.

FIG. 4 is a diagram of a client 110, according to an exemplary embodiment. Referring to FIG. 4, the client 110 includes a media data reproducing unit 410 and an information receiving unit 420, and the media data reproducing unit 410 includes a browser driving unit 412 and an application driving unit 414.

The media data reproducing unit 410 requests a media server 120 or 320 for media data, receives the media data, and reproduces the received media data.

The browser driving unit 412 drives a browser that provides an environment for driving an application for reproduction of the media data. The browser provides at least one API related to reproduction of the media data. The browser may be a browser compatible with the CEA-2014. As described above, the API related to reproduction of the media data includes an API for restricting a control operation with respect to reproduction of the media data. The application may be a webpage related to reproduction of the media data.

The application driving unit 414 drives the application related to reproduction of the media data based on the browser driven by the browser driving unit 412. The application driving unit 414 requests the media server 120 or 320 for the application related to reproduction of the media data (e.g., the webpage), receives the application, and drives the application.

Also, the application driven by the application driving unit 414 retrieves the API included in the browser, wherein the API is for restricting the control operation with respect to reproduction of the media data. The application driving unit 414 retrieves the API, based on information about restriction on the control operation received by the information receiving unit 420, and restricts the control operation with respect to reproduction of the media data. For example, based on the information, it is possible to restrict pausing or stopping of reproduction of the media data, or to restrict recording of the media data. A detailed description related to restriction on the control operation is provided above with reference to FIGS. 2A and 2B.

When restriction is set with respect to the control operation, the media data is reproduced based on the restricted control operation. According to the CEA-2014 standard, all control operations related to reproduction of the media data are defined by APIs of the browser. Thus, according to the present exemplary embodiment, an API for restriction of a control operation may be added to the browser in the form of an embedded object or a plug-in object, and the control operation may be restricted based on the added API.

In this manner, since the control operation with respect to reproduction of the media data may be restricted external to the client 110 by using the added API, a user may not discretionally skip or fast forward commercial content such as an advertisement, so that consumption of the media data may be commercially implemented.

The information receiving unit 420 receives the information about restriction on the control operation with respect to reproduction of the media data from the media server 120 or the third server 350. As described above, the information about restriction on the control operation may be received in the form of a notification from the media server 120 or the third server 350 after a session for reproduction of the media data is started, or may be received from the media server 120 or the third server 350 according to AJAX. Also, as described above, the information about restriction on the control operation may be transmitted in the form of metadata to the client 110 before a session for reproduction of the media data is started.

The information receiving unit 420 may be pushed to receive the information about restriction on the control operation from the media server 120 or the third server 350. Moreover, the information receiving unit 420 may request the information about restriction on the control operation from the media server 120 or the third server 350, and may receive the information in response to the request.

Figure 5:
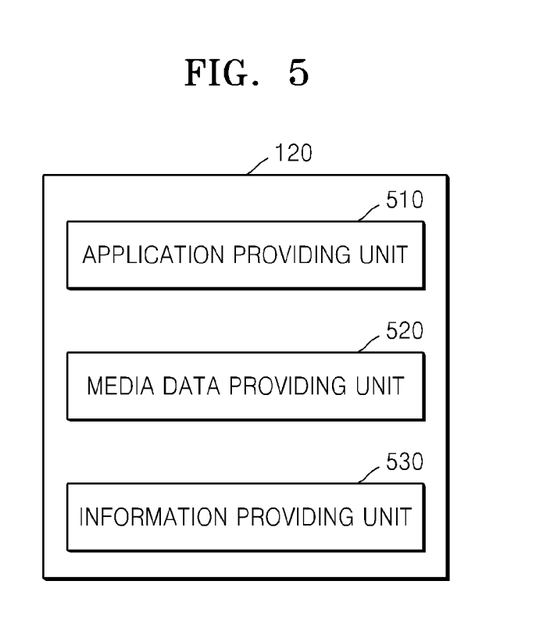
FIG. 5 is a diagram of a media server, according to an exemplary embodiment.

FIG. 5 is a diagram of a media server 120, according to an exemplary embodiment. FIG. 5 illustrates a structure of the media server 120 in cases where the media server 120 transmits information to the client 110, wherein the information is about restriction on a control operation with respect to reproduction of media data. Referring to FIG. 5, the media server 120 includes an application providing unit 510, a media data providing unit 520, and an information providing unit 530.

The application providing unit 510 provides an application (e.g., a webpage) related to reproduction of the media data to the media data reproducing unit 410 of the client 110. When the application providing unit 510 receives a request related to provision of the application from the client 110, the application providing unit 510 provides the application (e.g., a webpage including a link or a script related to reproduction of the media data) in response to the request.

The media data providing unit 520 provides the media data reproducing unit 410 of the client 110 with media data requested by the client 110.

The information providing unit 530 transmits the information about restriction on the control operation with respect to reproduction of media data to the client 110. For example, after a session for reproduction of the media data is started, the information providing unit 530 transmits the information about restriction on the control operation to the client 110 as a notification, or transmits the information about restriction on the control operation to the client 110 according to AJAX. Moreover, as described above, the information about restriction on the control operation may be transmitted to the client 110 as metadata before a session for reproduction of the media data is started.

Figure 6:
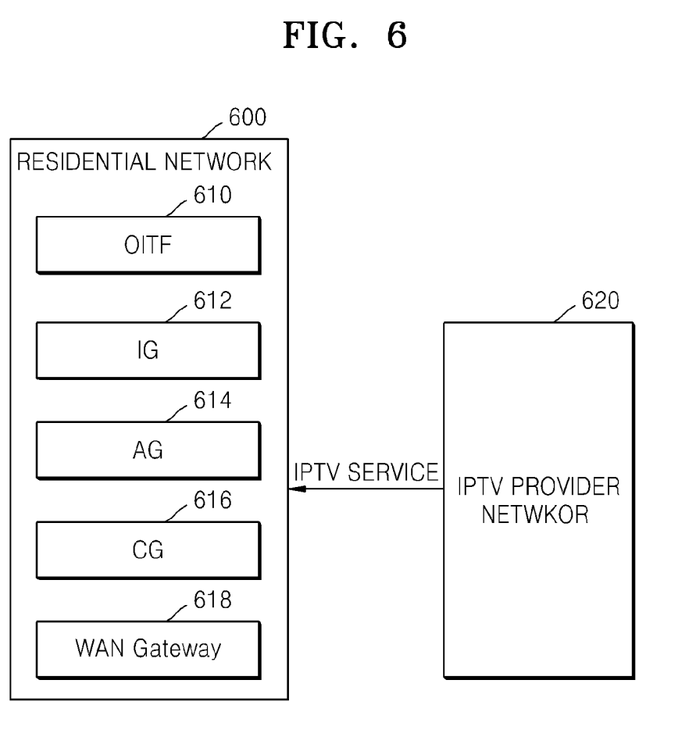
FIG. 6 is a diagram of an Internet Protocol Television (IPTV) service system, according to an exemplary embodiment.

FIG. 6 is a diagram of an Internet Protocol Television (IPTV) service system, according to an exemplary embodiment. FIG. 6 illustrates a configuration of a residential network 600 based on a functional architecture of an open IPTV.

Referring to FIG. 6, the residential network 600 of the IPTV service system includes an Open IPTV Terminal Functional (OITF) device 610, an IP Multimedia Subsystem (IMS) gateway (IG) 612, an application gateway (AG) device 614, a Content and Service Protection (CSP) Gateway (CG) device 616, and a Wide Area Network (WAN) gateway device 618. FIG. 6 corresponds to cases in which the above devices 610 to 618 of the residential network 600 are separate from each other. However, it is understood that two or more of the above devices 610 to 618 may be modules included in one device.

An IPTV service is provided from an IPTV service provider server 620 to the residential network 600, and the IG device 612, the AG device 614, the CG device 616, and the WAN gateway 618 receives the provided IPTV service and relays the IPTV service to the OITF device 610.

The IPTV service provider server 620 corresponds to a media server 120, and provides the OITF device 610 with media data, an application related to reproduction of the media data, and information about restriction on reproduction of the media data.

The OITF device 610 consumes the IPTV service of one of a plurality of IPTV service providers. The OITF device 610 selects one of the plurality of IPTV service providers according to a user input, and consumes the IPTV service provided by the selected IPTV service provider. The OITF device 610 may be a device such as a TV that receives and consumes a service.

The OITF device 610 corresponds to a client 110 or 310. In other words, the OITF device 610 receives the media data related to the IPTV service from the IPTV service provider server 620, reproduces the media data, and drives the application related to reproduction of the media data based on a browser including an API related to reproduction of the media data and an API related to restriction on the control operation.

The IG device 612 allows an IPTV service access in conjunction with an IMS of the OITF device 610. The IG device 612 receives the IPTV service from the IPTV service provider server 620 and relays the IPTV service to the OITF device 610. The IG device 612 interacts with the OITF device 610 by using a predetermined protocol that is defined for interaction between devices in the residential network 600. According to an IPTV service provision request from the OITF device 610, the IPTV service is requested from the IPTV service provider server 620, the IPTV service is received, and the received IPTV service is relayed to the OITF device 610.

The AG device 614 receives the application and relays the received application to the OITF device 610. In cases where a predetermined application is used for the IPTV service, the AG device 614 receives the application from the IPTV service provider server 620 and provides the application to the OITF device 610. It is understood that the AG device 614 may be omitted, for example when it is not necessary for the OITF device 610 to be provided the application.

Furthermore, it is understood that the CG device 616 is an optional device that may be used when IPTV content and service protection of an external network are converted into protection (e.g., Digital Transmission Content Protection over IP (DTCP-IP)) that is acceptable to the OITF device 610.

The WAN gateway 618 is used to support a physical connection between the residential network 600 and the IPTV service provider server 620.

The apparatus for reproducing media data and the apparatus for providing media data according to exemplary embodiments may include a bus coupled to each unit of the devices illustrated in FIGS. 4 and 5, and at least one processor coupled to the bus. Also, the apparatuses may include a memory coupled to the at least one processor that is combined with the bus so as to store commands, received messages, and generated messages, and to execute the commands.

According to exemplary embodiments, since a user may not discretionally control reproduction of the media data, the user may not skip commercial content such as an advertisement. Thus, consumption of the media data may be further commercially implemented. Also, a content market may be expanded by activating an online content market.

Exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

The computer readable recording medium can also be distributed over network coupled computer systems so that the computer readable code is stored and executed in a distributed fashion.

While exemplary embodiments have been particularly shown and described above, it will be understood by those of ordinary skill in the art that various changes in form and details may be made therein without departing from the spirit and scope of the present invention as defined by the following claims.

What is claimed is:

1. A method of reproducing media data received from a media server, performed by a client device, the method comprising:

driving a browser comprising an application programming interface (API) for restricting a control operation with respect to reproduction of the media data by the client device;

restricting the control operation with respect to the reproduction of the media data by using the API; and reproducing the media data based on the restricted control operation, wherein the reproducing of the media data comprises:

when an input indicating a control operation is received from a user, determining whether the control operation is a restricted control operation; and as a result of the determining, if the control operation is a restricted control operation, ignoring the control operation and continuing reproducing of the media data.

2. The method of claim 1, wherein the restricting the control operation comprises:

receiving information about the restricting the control operation; and retrieving the API for restricting the control operation with respect to the reproduction of the media data, according to the received information.

3. The method of claim 2, wherein the receiving the information comprises receiving the information about the restricting the control operation as metadata before a session for the reproduction of the media data is started, or receiving the information about the restricting the control operation as a notification according to a Consumer Electronics Association (CEA)-2014 standard during a session for the reproduction of the media data, wherein the notification is related to the restricting the control operation.

4. The method of claim 2, wherein the receiving the information comprises receiving the information about the restricting the control operation according to Asynchronous JavaScript and Extensible Markup Language (AJAX) during a session for the reproduction of the media data.

5. The method of claim 2, wherein the receiving the information comprises receiving the information about the restricting the control operation from a server that is different from the media server.

6. The method of claim 2, wherein the retrieving the API comprises retrieving an API for restricting stopping of the reproduction of the media data.

7. The method of claim 2, wherein the retrieving the API comprises retrieving an API for restricting recording of the media data.

8. A non-transitory computer readable recording medium having recorded thereon a program for executing the method of claim 1.

9. The method of claim 1, further comprising:

receiving, from a server, an application for reproducing the media data, wherein the reproducing the media data comprises driving the received application to reproduce the media data.

10. The method of claim 9, wherein the application retrieves the API comprised in the browser to restrict the control operation while reproducing the media data.

11. The method of claim 9, wherein the application is a webpage.

12. The method of claim 1, wherein the media data is advertisement content.

13. A media data reproducing apparatus for reproducing media data received from a media server, the media data reproducing apparatus comprising:

a browser driving unit which drives a browser comprising an application programming interface (API) for restricting a control operation with respect to reproduction of the media data; and an application driving unit which restricts the control operation with respect to the reproduction of the media data by using the API, and which drives an application that reproduces the media data based on the restricted control operation, wherein, when the application driving unit receives an input indicating a control operation from a user, the application driving unit determines whether the control operation is a restricted control operation, and as a result of the determining, if the control operation is a restricted control operation, the application driving unit ignores the control operation and continues reproducing of the media data.

14. The media data reproducing apparatus of claim 13, further comprising:

an information receiving unit which receives information about the restricting of the control operation, wherein the application driving unit retrieves the API for restricting the control operation with respect to the reproduction of the media data, according to the received information.

15. The media data reproducing apparatus of claim 14, wherein the application driving unit receives the information that is about the restricting of the control operation as metadata before a session for the reproduction of the media data is started, or receives the information about the restricting the control operation as a notification according to a Consumer Electronics Association (CEA)-2014 standard during a session for the reproduction of the media data, wherein the notification is related to the restricting of the control operation.

16. The media data reproducing apparatus of claim 14, wherein the application driving unit receives the information about the restricting of the control operation according to Asynchronous JavaScript and Extensible Markup Language (AJAX) during a session for the reproduction of the media data.

17. The media data reproducing apparatus of claim 14, wherein the application driving unit receives the information about the restricting of the control operation from a server that is different from the media server.

18. The media data reproducing apparatus of claim 14, wherein the application driving unit retrieves an API for restricting stopping of the reproduction of the media data.

19. The media data reproducing apparatus of claim 14, wherein the application driving unit retrieves an API for restricting recording of the media data.

20. A method of providing media data, the method comprising:

transmitting, from a first server to a client device, media data; and transmitting, from a second server to the client device, information about restricting a control operation with respect to a reproduction of the media data by the client device, wherein the information is used by the client device to retrieve an application programming interface (API) for restricting the control operation with respect to the reproduction of the media data.

21. The method of claim 20, wherein the first server is different from the second server.

22. The method of claim 20, wherein the first server is the same as the second server.

23. The method of claim 20, further comprising transmitting, from the first server to the client device, an application which reproduces the media data and which retrieves the API according to the information.

24. A non-transitory computer readable recording medium having recorded thereon a program for executing the method of claim 20.

25. The method of claim 20, wherein, when an input indicating a control operation is received by the client device, the client device determines whether the control operation is a restricted control operation and, as a result of the determining, if the control operation is a restricted control operation, ignores the control operation and continues reproducing of the media data based on the retrieved API.

26. A method of reproducing media data received from a media server, performed by a client device, the method comprising:
   restricting a control operation with respect to a reproduction, by the client device, of media data by using an application programming interface (API); and
   reproducing the media data based on the restricted control operation, wherein the reproducing of the media data comprises:
   when an input indicating a control operation is received from a user, determining whether the control operation is a restricted control operation; and
   as a result of the determining, if the control operation is a restricted control operation, ignoring the control operation and continuing reproducing of the media data based on the retrieved API.

* * * * *